UNITED STATES PATENT OFFICE.

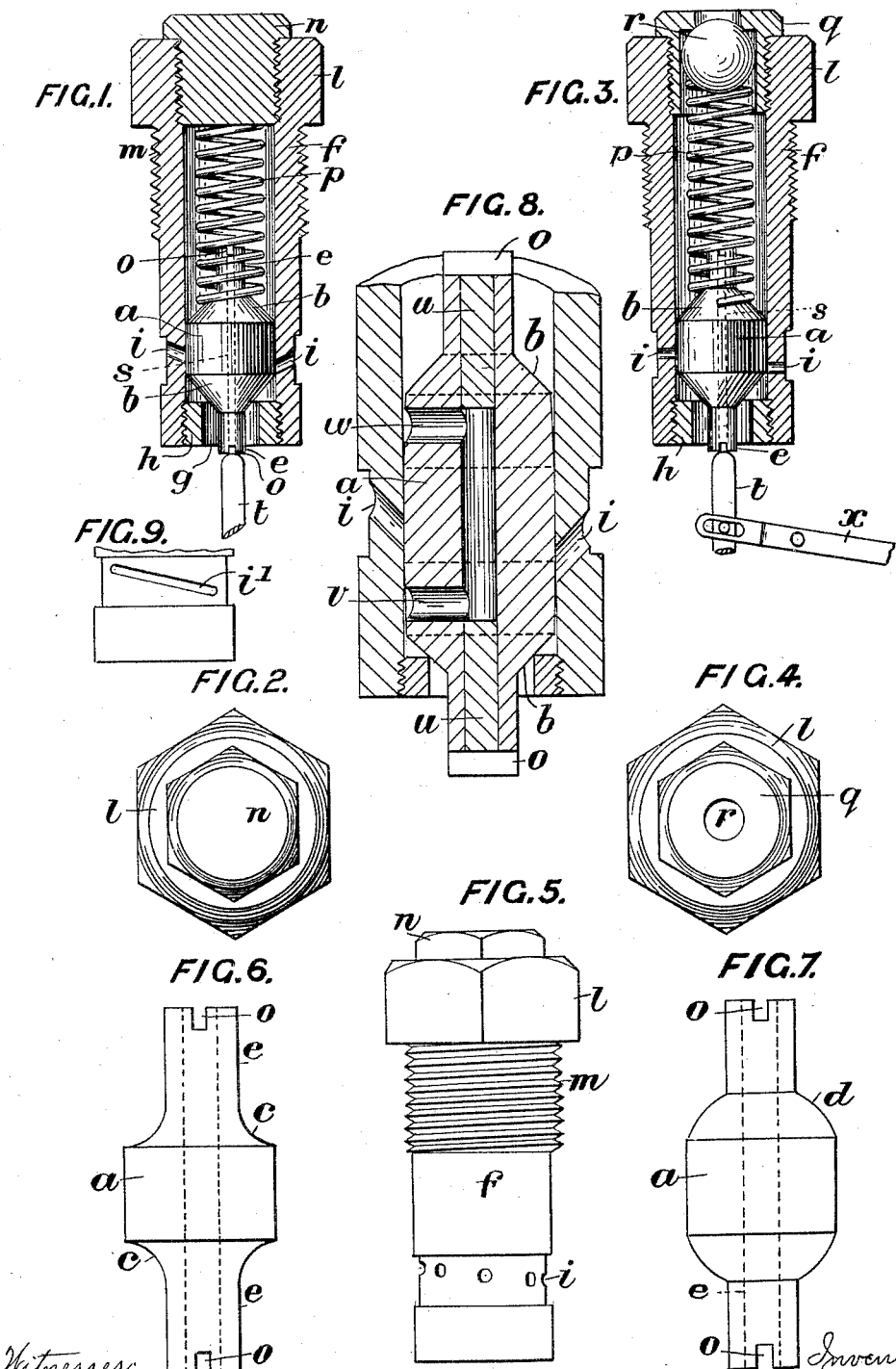

JOSEPH FRANCIS OVENDEN, OF SOUTH CROYDON, ENGLAND, ASSIGNOR TO INGERSOLL-RAND COMPANY, OF LONDON, ENGLAND.

VARIABLE-THROTTLE VALVE.

1,099,719.   Specification of Letters Patent.   Patented June 9, 1914.

Application filed November 11, 1913. Serial No. 800,340.

*To all whom it may concern:*

Be it known that I, JOSEPH FRANCIS OVENDEN, a subject of the King of Great Britain, and resident of South Croydon, in the county of Surrey, England, have invented a new or Improved Variable-Throttle Valve, of which the following is a specification.

This invention relates to a new or improved variable throttle valve which is especially applicable for controlling the supply of fluid such as for example air or steam under pressure to percussive tools such as rock drills, percussive hammers such for example as are employed for chipping and riveting, and other similar operating tools, the said valve being also preferably so constructed as to facilitate the introduction of lubricant not only to the said valve but also to other parts of the apparatus.

The invention concerns throttle valves in which a cylindrical piston device is movable in relation to ports formed in the wall of the cylindrical valve casing and a mitered or other shaped end on the piston is seated upon an annular seating at one end of the casing when the piston device covers the ports and is lifted from such seating when the piston device is moved in the direction for uncovering the ports aforesaid.

The valve is adapted for variable throttling by forming the port or ports in such a manner that during the opening movement of the piston valve the port or ports is or are gradually uncovered. This is accomplished for example by forming a number of ports around the casing at different or graduated distances from the valve seat. Preferably each end of the piston device is formed with a miter or with a taper or rounded or hollow surface suitable for acting as a valve and if desired cylindrical extensions of relatively small diameter and length may be formed on each end. The valve seating may consist of an externally screw-threaded ring screwing into the casing. The end of the casing remote from the main valve seat is conveniently closed by a removable plug which also serves as an abutment for the spring which tends to keep the valve on its end seating. This plug may be solid, or it may be hollow and perforated for the introduction of lubricant, being then normally closed by a ball or other valve. The ports for the admission of pressure fluid to the casing which are made at different distances from the valve seat as aforesaid may be drilled at an angle to the axis of the casing so as to point more or less in the direction of the valve seat. The valve itself is preferably perforated for instance with an axial hole through which oil passes from the valve casing into the tool to lubricate all parts thereof.

Figure 1 of the accompanying drawings is a vertical section of a throttle valve constructed according to this invention. Fig. 2 is a plan of the same. Fig. 3 is a sectional elevation of a throttle valve provided with means for the admission of oil thereto for lubricating purposes. Fig. 4 is a plan thereof and, Fig. 5 is an elevation of the casing shown in Fig. 1. Figs. 6 and 7 are elevations of two slightly modified forms of throttle valves. Fig. 8 is a section of part of another modification and Fig. 9 is an elevation illustrating a modified inlet port.

As shown in Figs. 1 and 2 the valve consists of a cylindrical body $a$ with conical ends $b\ b$, or as shown in Fig. 6 the ends $c\ c$ may have a hollow taper, or as shown in Fig. 7 the ends $d\ d$ may be rounded convexedly. Preferably the valve is provided with a central stem or cylindrical extension $e$ of relatively small diameter and length at each end. By making the valve ends identical it follows that when one end becomes worn or damaged its position in the casing may be reversed and practically the life of the valve is doubled. The said valve fits freely in a hollow cylindrical casing $f$ open at one end $g$ and there provided with an externally screw-threaded ring screwing into the casing and forming a valve seating $h$. It will be noted that the upper inner edge of the ring $h$ makes a line contact with the conical end $b$ when the latter seats itself upon the ring, this line contact being preferred to an annular surface contact such as would be produced by forming a miter face or bevel on the ring $h$. Inlets $i$ are adapted to be closed by the cylindrical portion $a$ of the valve when the valve is on its seat $h$, a spring $p$ tending to keep the valve on its seat $h$. One end of the valve casing $f$ is suitably provided with a hexagon shaped portion $l$ and externally the casing is furnished with a screw thread $m$ which is adapted to secure the valve casing $f$ in a screw-threaded hole in the handle or frame of the percussive or other tool. If desired, the casing may be open at both ends, but the opening at the end remote from the valve seating $h$ is provided with a plug $n$ which, when removed permits of the insertion of a screw driver which takes into a transverse slot $o$ in the stem of the valve so that the latter may be ground on to its seat $h$. The plug $n$ moreover serves as an abutment for the spring $p$, preferably a helical spring, tending to keep the valve onto its seat. The plug $n$ may be solid, or as shown in Figs. 3 and 4, the plug $q$ is perforated and provided with a seat for a ball or other valve $r$ kept in place by the aforesaid helical spring $p$ but displaceable by the spout of an oil can when it is desired to introduce lubricant. The valve itself is preferably provided with an axial hole $s$ through which oil passes to the motor served by the valve.

As shown in Fig. 1 the inlets $i$ are drilled at an angle so as to point more or less in the direction of the valve seat $h$, whereas in Fig. 3 they are at right angles to the axis of the casing $f$, but in either case they are made at different distances from the valve seat. The valve is pressed away from the seating by means for example of a push pin or plunger $t$ (Figs. 1 and 3) which is operated by a suitable lever $x$. As the valve is raised one inlet port $i$ after another is uncovered until they are all fully open. Instead of the axial hole of the valve extending from end to end, it may, as shown in Fig. 8, be closed at each end by plugs $u$ and provided with lateral ports or openings $v$ and $w$. The body portion of this valve is cylindrical in the middle and tapers then very slightly toward the places where the miter valve ends begin so as to allow of the passage of the lubricant. In place of an inclined series of inlet holes $i$, an inclined aperture or slot $i'$ may be used as shown in Fig. 9.

I claim:—

1. A throttle valve, comprising a cylindrical piston valve formed with a tapered end portion and also with a passage communicating between points situated at opposite ends of the cylindrical portion of said valve, a cylindrical casing inclosing said piston valve with a sliding fit, said casing having a port formed in the wall thereof, an annular seating in the interior of said casing, a spring seated within said casing and adapted to force said valve in the direction for maintaining said tapered portion in contact with said seating in which position said piston valve covers said port, and means on said casing for permitting of the introduction of lubricant into the same substantially as set forth.

2. A throttle valve, comprising a cylindrical piston valve formed with a tapered end portion and also with a passage communicating between points situated at opposite ends of the cylindrical portion of said valve, a cylindrical casing inclosing said piston valve with a sliding fit, said casing having a port formed in the wall thereof, an annular seating in the interior of said casing at one end thereof, a hollow plug closing the opposite end of said casing, a spring compressed between said plug and said piston valve and constantly tending to hold the tapered portion of said valve in contact with said seating in which position said piston valve covers said port, and a self closing valve arranged in said hollow plug and adapted to normally close the passage through said plug substantially as set forth.

JOSEPH FRANCIS OVENDEN.

Witnesses:
W. MORBEY,
W. E. ROGERS.

Copies of this patent may be obtained for five cents each, by addressing the "Commissioner of Patents, Washington, D. C."